United States Patent
Bhattacharya et al.

(10) Patent No.: US 9,127,222 B2
(45) Date of Patent: Sep. 8, 2015

(54) SYSTEM AND METHOD FOR PROTECTING GASIFIER QUENCH RING

(75) Inventors: Paromita Bhattacharya, Bangalore (IN); Atul Kumar Vij, Bangalore (IN); Rajeshwar Sripada, Bangalore (IN)

(73) Assignee: General Electric Company, Schenectady, NY (US)

( * ) Notice: Subject to any disclaimer, the term of this patent is extended or adjusted under 35 U.S.C. 154(b) by 545 days.

(21) Appl. No.: 13/549,385

(22) Filed: Jul. 13, 2012

(65) Prior Publication Data

US 2014/0014186 A1  Jan. 16, 2014

(51) Int. Cl.
| | |
|---|---|
| *C10J 3/72* | (2006.01) |
| *C10J 3/84* | (2006.01) |
| *C10J 3/48* | (2006.01) |
| *C10K 1/00* | (2006.01) |

(52) U.S. Cl.
CPC ........ *C10J 3/845* (2013.01); *C10J 3/485* (2013.01); *C10J 3/723* (2013.01); *C10J 2300/1653* (2013.01); *C10J 2300/1656* (2013.01); *C10J 2300/1678* (2013.01); *C10K 1/005* (2013.01); *Y02E 20/16* (2013.01); *Y02E 20/18* (2013.01); *Y10T 137/0318* (2015.04); *Y10T 137/8593* (2015.04)

(58) Field of Classification Search
USPC ......... 48/61, 127.9, 127.1, 76, 77, 71, 72, 73, 48/74, 200, 201, 202, 203, 204, 210, 212, 48/213, 69; 165/133
See application file for complete search history.

(56) References Cited

U.S. PATENT DOCUMENTS

| | | | |
|---|---|---|---|
| 4,042,334 A | | 8/1977 | Matovich |
| 4,054,424 A | * | 10/1977 | Staudinger et al. ............ 48/210 |
| 4,466,808 A | * | 8/1984 | Koog .......................... 48/197 R |
| 4,828,579 A | | 5/1989 | Becker et al. |
| 4,828,580 A | | 5/1989 | Dach |
| 4,859,213 A | | 8/1989 | Segerstrom |
| 4,936,871 A | * | 6/1990 | Wilmer et al. ............. 48/197 R |
| 5,976,203 A | * | 11/1999 | Deeke et al. ................. 48/62 R |
| 2007/0062117 A1 | * | 3/2007 | Schingnitz et al. ............ 48/210 |
| 2007/0294943 A1 | | 12/2007 | Van Den Berg et al. |
| 2008/0000155 A1 | | 1/2008 | Van Den Berg et al. |
| 2008/0182912 A1 | | 7/2008 | Van Den Berg et al. |
| 2009/0199474 A1 | * | 8/2009 | Leininger et al. ................. 48/69 |
| 2010/0263278 A1 | * | 10/2010 | Kowoll et al. ..................... 48/67 |
| 2011/0162277 A1 | * | 7/2011 | Russell et al. ..................... 48/77 |
| 2012/0055087 A1 | * | 3/2012 | Ullrich .............................. 48/61 |
| 2013/0192501 A1 | | 8/2013 | Lu et al. |
| 2013/0255916 A1 | * | 10/2013 | Zhou et al. ............... 165/104.11 |

FOREIGN PATENT DOCUMENTS

| | | |
|---|---|---|
| CN | 102203222 A | 9/2011 |
| JP | 59012294 A * | 1/1984 |

OTHER PUBLICATIONS

EP Search Report and Opinion dated Oct. 1, 2013 from corresponding EP Application No. 13176143.9.

* cited by examiner

*Primary Examiner* — Kaity Handal
(74) *Attorney, Agent, or Firm* — Fletcher Yoder, P.C.

(57) ABSTRACT

A system includes a gasifier. The gasifier includes a reaction chamber configured to convert a feedstock into a synthetic gas, a quench chamber configured to cool the synthetic gas, and a transition section between the reaction chamber and the quench chamber. The gasifier also includes a quench ring configured to provide a first flow of a coolant to the quench chamber and a shielding gas system configured to provide a second flow of a shielding gas to protect at least one of the quench ring or the transition section.

23 Claims, 5 Drawing Sheets

SYSTEM AND METHOD FOR PROTECTING GASIFIER QUENCH RING

BACKGROUND OF THE INVENTION

The subject matter disclosed herein relates to gasifiers and, more particularly, to systems and methods to improve the life of quench rings for gasifiers.

Gasifiers convert carbonaceous materials into a mixture of carbon monoxide and hydrogen, referred to as synthesis gas, synthetic gas, or syngas. For example, an integrated gasification combined cycle (IGCC) power plant includes one or more gasifiers that react a feedstock at a high temperature with oxygen and/or steam to produce syngas. Upon gasification, the resulting syngas may include less desirable components, such as ash. The syngas may be directed through a quench chamber to cool the syngas to a saturation temperature and remove the less desirable components as a slag. Unfortunately, certain components of the quench chamber are subject to thermal stresses or corrosion from the syngas and slag, which may reduce the efficiency and operability of the gasifier.

BRIEF DESCRIPTION OF THE INVENTION

Certain embodiments commensurate in scope with the originally claimed invention are summarized below. These embodiments are not intended to limit the scope of the claimed invention, but rather these embodiments are intended only to provide a brief summary of possible forms of the invention. Indeed, the invention may encompass a variety of forms that may be similar to or different from the embodiments set forth below.

In a first embodiment, a system includes a gasifier. The gasifier has a reaction chamber configured to convert a feedstock into a synthetic gas, a quench chamber configured to cool the synthetic gas, and a transition section between the reaction chamber and the quench chamber. The gasifier also has a quench ring and a shielding gas system. The quench ring is configured to provide a first flow of a coolant to the quench chamber, and the shielding gas system is configured a second flow of a shielding gas to protect at least one of the quench ring or the transition section.

In a second embodiment, a system includes a shielding gas system having a shielding gas injector configured to provide a flow of a shielding gas to protect at least one of a quench ring in a quench chamber or a transition section between reaction and quench chambers of a gasifier.

In a third embodiment, a method includes providing a flow of a shielding gas to protect at least one of a quench ring or a transition section of a gasifier. The quench ring is disposed in a quench chamber of the gasifier, and the transition section is disposed between the quench chamber and a reaction chamber of the gasifier.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION OF THE INVENTION

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements.

The present disclosure is directed to systems and methods to improve the life of a quench ring of a gasifier. In particular, a shielding gas injector provides flow of a shielding gas along a surface of the quench ring and a transition section of the gasifier. The flow of shielding gas creates an insulating barrier that protects the quench ring and the transition section by inhibiting thermal stress and/or corrosion. For example, the insulating barrier may reduce the thermal stress of the quench ring caused by high temperature syngas. In addition, the shielding gas may reduce or inhibit recirculation of syngas in stagnant zones near the quench ring and the transition region, thereby reducing corrosion and/or thermal stress in the stagnant zones. In certain embodiments, the shielding gas may be an inert gas, such as nitrogen or carbon dioxide. In addition, the shielding gas may be provided by equipment within a gasification system, such as an air separation unit or a syngas treatment system.

Figure 1:
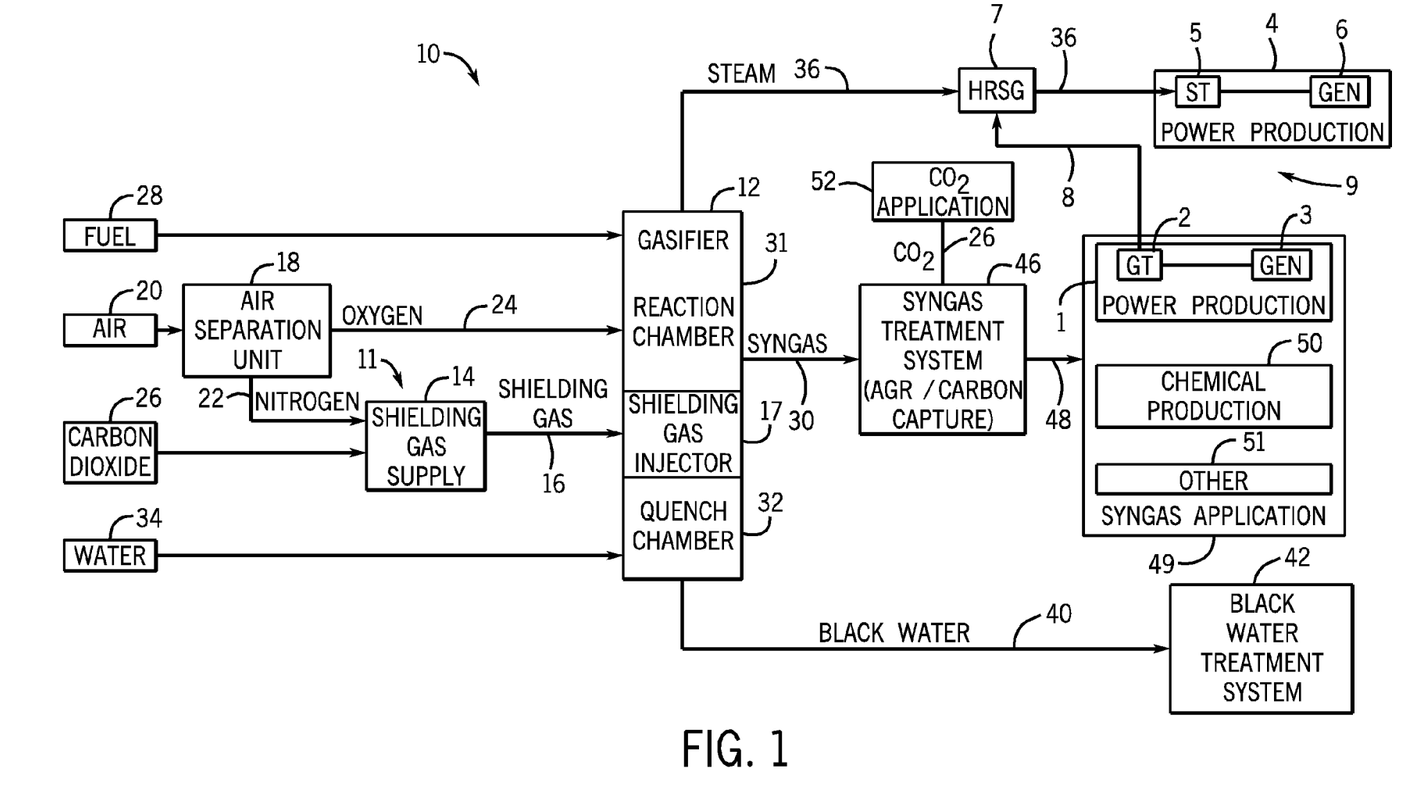
FIG. 1 is a schematic diagram of an embodiment of a gasifier system illustrating various components of the gasifier system, including a gasifier.

Turning now to the figures, FIG. 1 illustrates an embodiment of a gasification system 10 with various components for generating and treating syngas, wherein the system 10 includes a shielding gas system 11 configured to protect one or more components of a gasifier 12 from thermal and/or chemical degradation. In certain embodiments, the gasification system 10 may be an integrated gasification combined cycle (IGCC) power plant, which may include a gas turbine generator 1 (e.g., first power production system) having a gas turbine 2 drivingly coupled to an electrical generator 3, a steam turbine generator 4 (e.g., second power production system) having a steam turbine 5 drivingly coupled to an electrical generator 6, a heat recovery steam generator (HRSG) 7, and the gasifier 12 with the shielding gas system 11. The HRSG 7 is configured to recover heat, such as exhaust heat 8 from the gas turbine generator 1, in order to generate steam 36 for use in other plant components, such as the steam turbine generator 4. The gas turbine generator 1 and the steam turbine generator 4 work together, as a combined cycle system 9, to generate electricity. However, the disclosed embodiments are not limited to an IGCC power plant, and may apply to any reactor, such as the gasifier 12, coupled to a shielding gas supply 14.

As noted previously, the gasification system 10 includes the shielding gas system 11 coupled to the gasifier 12 to provide both thermal and chemical protection (e.g., shielding) to the gasifier 12 components. The shielding gas system 11 includes the gas shielding supply 14 that provides a shielding gas 16 to the gasifier 12 (e.g., to shielding gas injector 17), thereby improving the operability of the gasifier 12 by reducing thermal stress and corrosion caused by the syngas 30. In certain embodiments, the shielding gas 16 may be an inert gas and/or quasi inert gas that is generated within the gasification system 10. For example, an air separation unit (ASU) 18 disposed upstream of the gasifier 12 receives a stream of air 20, and separates the air 20 into nitrogen 22, oxygen 24, and other components (e.g., argon). The nitrogen 22 and/or the argon may be used as the shielding gas 16 within the shielding gas injector 17. As will be discussed further below, the gasification system 10 may treat the syngas 30 using various treating systems 46, such as an acid gas removal (AGR) system and/or a carbon capture system. Carbon dioxide ($CO_2$) 26 produced during syngas treatment may also be used as the shielding gas within the shielding gas injector 17.

As shown, the gasifier 12 receives a feedstock or fuel 28, steam 36, and oxygen 24 (e.g., oxygen from the air separation unit 18). The gasifier 12 reacts the fuel 28, steam 36, and oxygen 24 in a gasification chamber or reaction chamber 31, thereby generating the syngas 30. Thereafter, the syngas 30 flows into a quench chamber 32 of the gasifier 12, where the syngas 30 is cooled using a coolant (e.g., water 34). The water 34 absorbs heat from the syngas 30 to facilitate cooling of the syngas 30, and the water 34 also may generate steam 36 for use in the HRSG 7. For example, the steam 36 generated by the HRSG 7 and/or supplied to the HRSG 7 may be used in the steam turbine generator 13. A portion of the water 34 may remain in a liquid phase, where it collects particulates and impurities from the syngas 30. The mixture of water 34 and carbonaceous particulates exits the quench chamber 32 as black water 40. The black water 40 is directed to a black water treatment system 42, where the particulates and the water are treated and separated.

After being cooled in the quench chamber 32, the syngas 30 exits the gasifier 12 and flows to a syngas treatment system 46, which may include an acid gas removal (AGR) system, a carbon capture system, and various treatment units. The syngas treatment system 46 removes impurities, such as hydrogen sulfide ($H_2S$), nitrogen oxides ($NO_x$), sulfur oxides ($SO_x$), carbon dioxide ($CO_2$), and the like, from the syngas 30. As illustrated, treated syngas 48 exits the syngas treatment system 46 and flows to one or more downstream syngas applications or systems 49, such as the gas turbine generator 1 (e.g., first power production system), a chemical production system 50, and/or other syngas-based systems 51 (e.g., a reactor, combustor, boiler, furnace, etc.). As noted above, the syngas treatment system 46 may include an acid gas removal (AGR) system and a carbon capture system, which may include a carbon capture and sequestration (C&S) system. Thus, the carbon dioxide 26 may be removed from the syngas 30, and the carbon dioxide 26 may be supplied to one or more $CO_2$-based systems or applications 52 (e.g., the shielding gas system 11). For example, the shielding gas supply 14 may receive the carbon dioxide 26 from the syngas treatment system 46 or another source within the plant, thereby increasing plant efficiency by using an available resource (e.g., the $CO_2$ 26) within the plant to protect the gasifier 12. As will be discussed further in FIG. 2, the shielding gas 16 may improve the operability of the gasifier 12 by protecting the quench ring (and/or other components of the gasifier 12) from thermal stress and corrosion.

Figure 2:
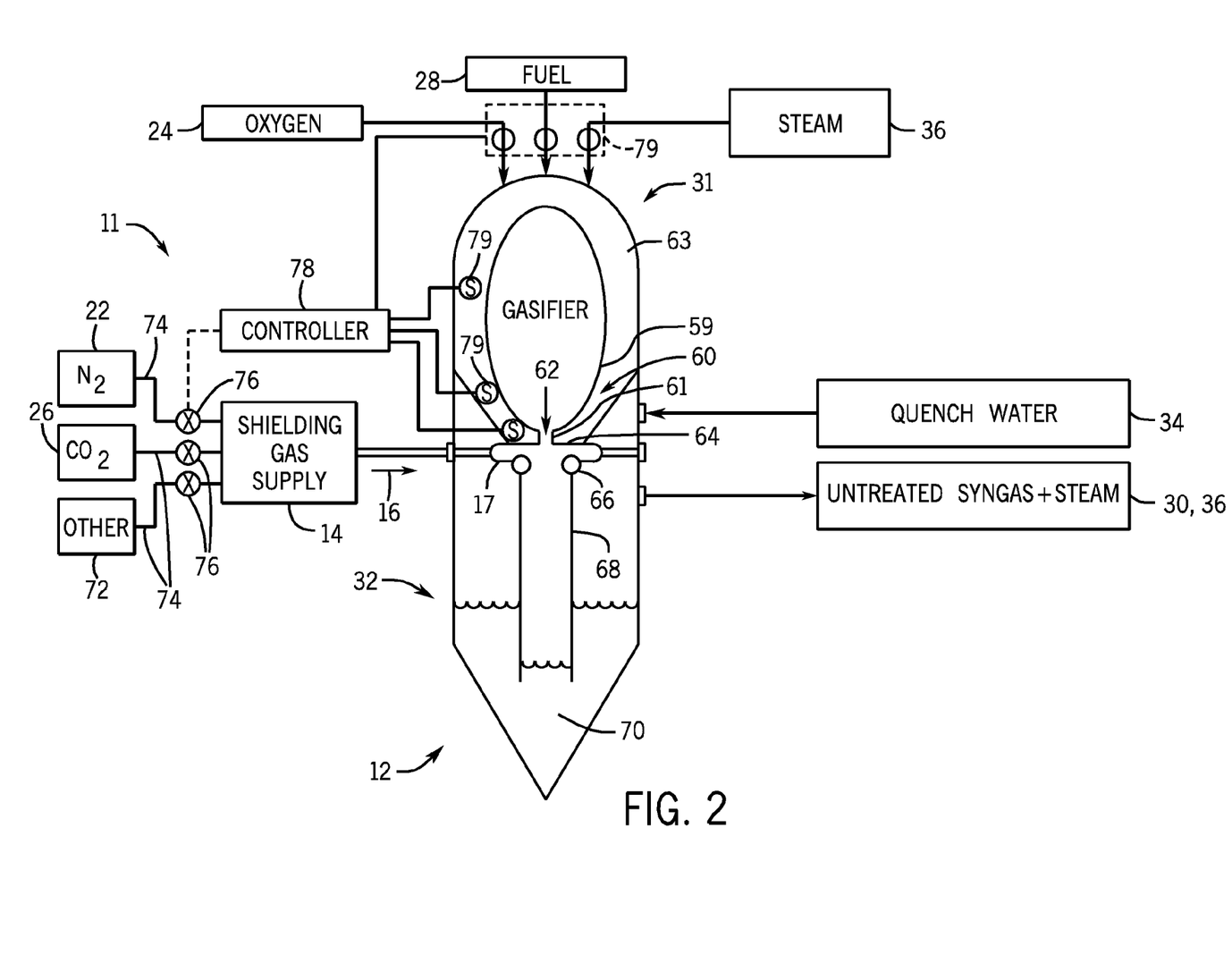
FIG. 2 is a schematic diagram of an embodiment of the gasifier of FIG. 1, illustrating various zones within the gasifier.

FIG. 2 illustrates an embodiment of the gasifier 12 that is coupled to the shielding gas system 11. The gasifier 12 may generally be divided into the reaction chamber 31, the quench chamber 32, and a transition section 60 disposed therebetween. The transition section 60 may include a converging portion 59 (e.g., decreasing diameter) leading to a throat portion 61 (e.g., minimum diameter). Within the reaction chamber 31, the fuel 28, the steam 36, and the oxygen 24 react to form the syngas 30. Thereafter, the syngas 30 flows through the transition section 60 and into the quench chamber 32, as illustrated by arrow 62. In certain embodiments, the reaction chamber 31 and the transition section 60 may include refractory materials 63, such as a refractory lining of refractory bricks (e.g., ceramic, bricks), that generally resist the high temperature of the syngas 30. A bottom plate 64 (e.g., a floor section) of the transition section 60 generally divides the transition section 60 and the quench chamber 32. Within the quench chamber 32, the water 34 cools the syngas 30, and the water 34 may also evaporate to produce steam 36. As illustrated, the water 34 is delivered using a quench ring 66. The quench ring 66 is disposed within the quench chamber 32 of the gasifier 12. In certain embodiments, the quench ring 66 may be annular in shape and generally concentric with the gasifier 12. The quench ring 66 delivers the water 34 along a dip tube 68, e.g., an annular tube adjacent and extending below the quench ring 66. The water 34 (e.g., black water 40) collects within a quench chamber sump 70 disposed at the bottom of the gasifier 12.

As shown, the shielding gas system 11 includes the shielding gas supply 14 and the shielding gas injector 17. The shielding gas supply 14 receives the nitrogen 22 from the air separation unit 18, the carbon dioxide 26 from the syngas treatment system 46, or another inert gas 72 (e.g., argon, helium, nitrogen, and the like) from another source. For example, the inert gas 72 may be nitrogen from a high pressure storage tank. As illustrated, the nitrogen 22, the carbon dioxide 26, and the inert gas 72 flow to the shielding gas injector 17 via fluid conduits 74. Control valves 76 are disposed within the fluid conduits 74, enabling selective flow control of the shielding gas 16 into the gasifier 12 adjacent the transition section 60 (e.g., bottom plate 64 and/or quench ring 66). For example, the nitrogen 22 from the air separation unit 18 is generally at a high pressure and may be used as the shielding gas 16 without a compressor. However, the carbon dioxide 26, due at least in part to its higher molecular weight, may be particularly efficient at protecting the quench ring 66 and the bottom plate 64. Unfortunately, the carbon dioxide 26 may not be available at certain times during operation of the gasifier 12 (e.g., during start-up). Accordingly, the nitrogen 22 may be used as the shielding gas until the carbon dioxide 26 becomes available. In other words, the shielding gas system 11 may selectively use one or more shielding gases, such as the nitrogen 22, carbon dioxide 26, and other inert gases 72, depending on availability and effectiveness at protecting the gasifier 12 components (e.g., bottom plate 64 and quench ring 66).

The shielding gas system 11 also includes a controller 78, which is communicatively coupled to the valves 76. The controller 78 may selectively open or close the valves 76 to enable use of a single shielding gas or a mixture of shielding gases 16. In certain embodiments, a mixture of the nitrogen 22, the carbon dioxide 26, and the inert gas 72, may provide for greater volumes or pressures of shielding gas 16, thereby increasing the resistance of the quench ring 66 and the bottom plate 64 to thermal stress and corrosion. Furthermore, in certain embodiments, in a start-up mode of operation, the controller 78 may selectively enable flow of the nitrogen 22 from the ASU 18 and/or storage tanks, carbon dioxide 26 from storage tanks, and/or other inert gases 72 from storage tanks or other available sources in the plant. In other words, while the gasifier 12 is starting up, the gas treatment system 46 may not receive any syngas, and thus may not produce any carbon dioxide 26 for use by the shielding gas system 11. Once the gasifier 12 (and the gasification system 10 as a whole) reaches a steady state condition, then the controller 78 may transition to another source of shielding gas 16, such as the carbon dioxide 26 produced by the gas treatment system 46.

The shielding gas system 11 also may include sensors 79, which provide feedback to the controller 78 to enable feedback control of the flow of shielding gas 16 into the gasifier 12. For example, the sensors 79 may include temperature sensors, pressure sensors, gas composition sensors, flow rate sensors, or any combination thereof. The temperature sensors 79 may monitor the temperature of the refractory materials 63 as an indication of the syngas temperature. The flow rate sensors 79 may monitor the flow rate of the oxygen 24, fuel 28, and/or steam 36 being supplied to the gasifier 12, thereby providing an indirect measure of the throughput of syngas 30 being generated in the gasifier 12. The feedback provided by these sensors 79 may enable the controller 78 to more intelligently increase or decrease the flow rate and/or pressure of the shielding gas 16 to protect the gasifier 12 components (e.g., bottom plate 64 and quench ring 66) from thermal stress and/or chemical attack. For example, the controller 78 may increase the flow rate of the shielding gas 16 if the sensors 79 indicate an increasing temperature or percentage of corrosive components of the syngas 30, while the controller 78 may decrease the flow rate of the shielding gas 16 if the sensors 79 indicate a decreasing temperature or percentage of corrosive components of the syngas 30. In other embodiments, the controller 78 may adjust the flow rate of the shielding gas 16 based on the flow rate of oxygen 24 and/or fuel 28, or a fuel/oxygen ratio. In other embodiments, the controller 78 may provide a first flow rate and/or composition (e.g., nitrogen) of the shielding gas 16 during startup of the gasifier 12, whereas the controller 78 may provide a second flow rate and/or composition (e.g., carbon dioxide) of the shielding gas 16 during steady state of the gasifier 12 and gas treatment system 46.

Figure 3:
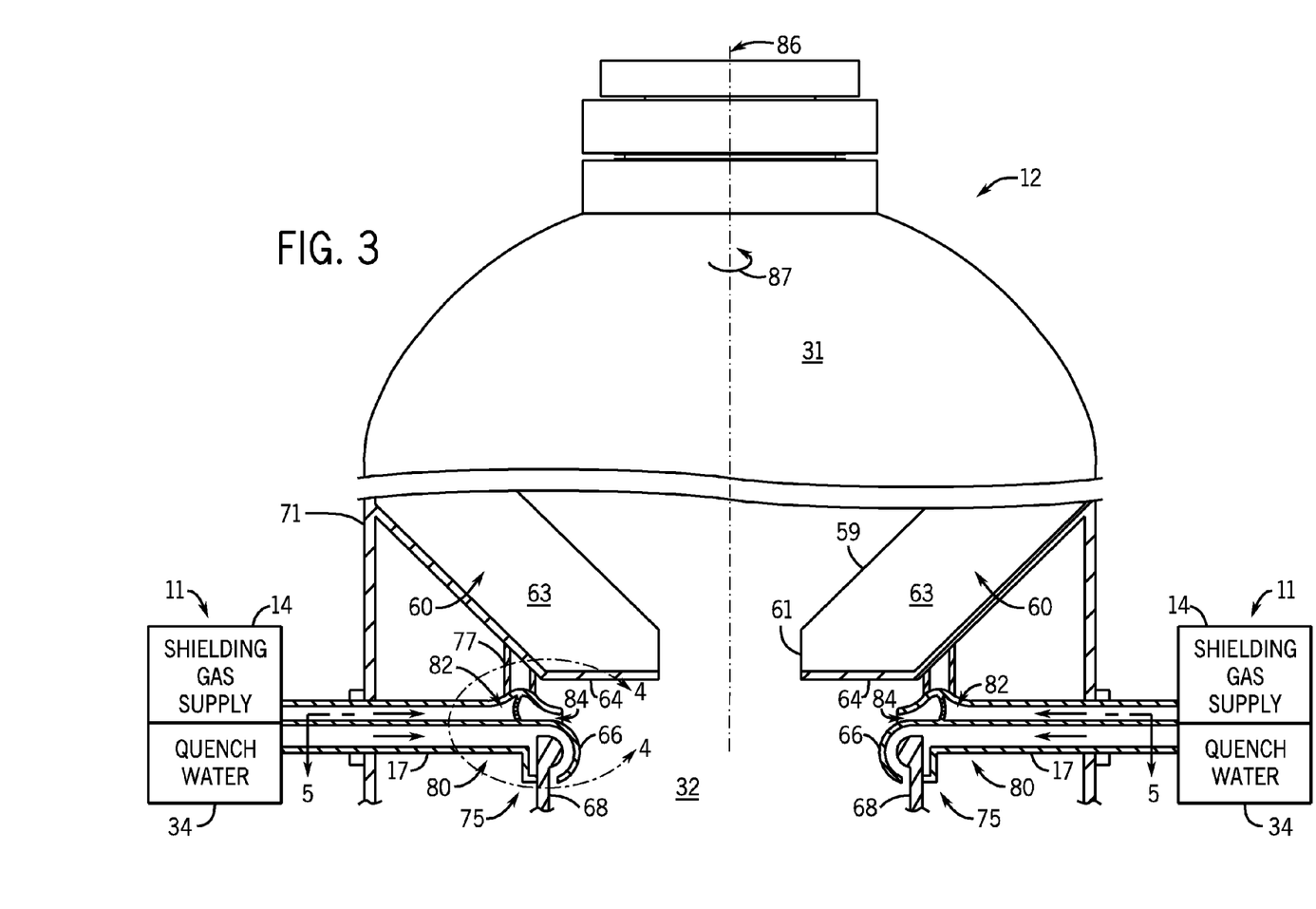
FIG. 3 is a cross-sectional side view of an embodiment of the gasifier of FIG. 1, illustrating a quench ring and a shielding gas system of the gasifier.

FIG. 3 is a partial schematic view of the gasifier 12 having the shielding gas system 11. As illustrated, the gasifier 12 has an outer shell 71, and the bottom plate 64 of the transition section 60 is coupled to the outer shell 71. Thus, the outer shell 71 provides support for the transition section 60. In certain embodiments, the quench ring 66 and the shielding gas injector 17 may be coupled together at a joint to form a gas shielded quench ring unit 75, which may be a retrofit kit. For example, the joint may include a welded joint, a bracket, fasteners such as bolts, or any other suitable coupling between the quench ring 66 and gas injector 17. In certain embodiments, the quench ring 66 and gas injector 17 may be integrally formed as a one-piece unit, while other embodiments may be a multi-piece assembly with separable components (e.g., ring 66 and injector 17). The unit or retrofit kit 75 may enable the shielding gas injector 17 to be retrofitted more easily into existing gasifiers 12. The combination of the quench ring 66 and the shielding gas injector 17 may be coupled (e.g., welded or fastened) at a joint 77 to the outer shell 71 or the bottom plate 64 of the transition section 60. Again, the joint 77 may include a welded joint, a bracket, fasteners such as bolts, or any other suitable coupling between the unit 75 (e.g., the quench ring 66 and/or gas injector 17) and the shell 71 and/or the bottom plate 64.

As shown, the syngas 30 flows from the reaction chamber 31, through the converging portion 59 (e.g., a tapered refractory section) and the throat portion 61 of the transition section 60, and into the quench chamber 32. As noted earlier, the transition section 60 may include refractory materials 63, which may generally withstand the high temperature of the syngas 30. The refractory materials 63 may line the interior of both the outer shell 71 and the transition section 60 to provide heat resistance. Furthermore, the shielding gas injector 17 may provide additional heat resistance to the bottom plate 64 and the quench ring 66. The additional heat resistance may be affected by the geometry of the shielding gas injector 17. As illustrated, the shielding gas injector 17 includes a hollow annular enclosure 80. The hollow annular enclosure 80 has an inlet 82 to receive the shielding gas 16 and an outlet 84 to inject the shielding gas 16 into the gasifier 12. The position of the shielding gas injector 17 within the gasifier 12 may also affect the additional heat resistance provided by the shielding gas 16. As shown, the shielding gas injector 17 may extend circumferentially about a central axis 86 of the gasifier 12, e.g., the transition section 60 and/or the quench ring 66. Such an arrangement may provide approximately symmetrical flow of shielding gas 16 about the bottom plate 64 and the quench ring 66, thereby improving the operability of the gasifier 12. Although the shielding gas system 11 of FIGS. 2 and 3 has the shielding gas injector 17 disposed adjacent (e.g., between) the bottom plate 64 of the transition section 60, one or more injectors 17 may be disposed in the gasifier 12 in various positions to protect the transition section 60, quench ring 66, and other gasifier 12 components.

Figure 4:
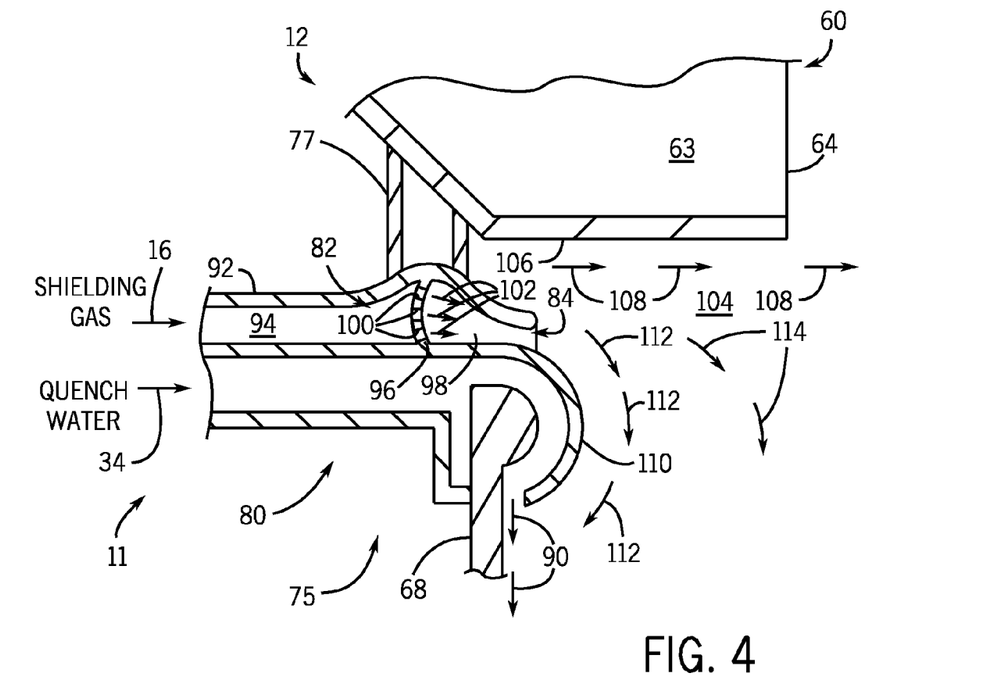
FIG. 4 is a cross-sectional side view of an embodiment of the quench ring and shield gas system of FIG. 3, taken within line 4-4, illustrating approximate flow profiles of coolant and shielding gas.

FIG. 4 is a partial schematic side view of the quench ring 66 and the shielding gas injector 17, illustrating approximate flow paths of the water 34 and the shielding gas 16. As shown, the water 34 exits the quench ring 66 through an opening 88 and flows downwards along the dip tube 68, as illustrated by arrows 90. The flow path of the shielding gas 16 is more complex. The shielding gas 16 enters the shielding gas injector 17 via an inlet gas conduit 92 leading to the inlet 82. Within the shielding gas injector 17, the shielding gas 16 enters a first chamber 94 and encounters a flow conditioning barrier 96. The flow conditioning barrier 96 separates the first chamber 94 from a second chamber 98 of the shielding gas injector 17. The flow conditioning barrier 96 is configured to condition the flow by reducing variations in the pressure, flow rate, and distribution circumferentially 87 about the axis 86. In other words, the flow conditioning barrier 96 is configured to provide a more uniform flow distribution and/or pressure circumferentially 87 about the axis 86. In the illustrated embodiment, the flow conditioning barrier 96 includes holes 100 to meter, distribute, and diffuse the shielding gas 16. As will be discussed further with respect to FIGS. 7 and 8, the shape of the holes 100 (e.g., round, rectangular, C-shaped, X-shaped, V-shaped, etc.) may be designed for desired amounts of flow, diffusion, and pressure drop across the flow conditioning barrier 96. As illustrated by arrows 102, the shielding gas 16 flows from the first chamber 94, to the second chamber 98 through the holes 100, and then exits the shielding gas injector 17 through the outlet 84.

After exiting the shielding gas injector 17, the shielding gas 16 enters a region 104 (e.g., an annular space) between the bottom plate 64 and the quench ring 66. As shown, a portion of the shielding gas 16 (e.g., a shielding gas film or blanket) may flow along an exposed surface 106 of the bottom plate 64, as illustrated by arrows 108. The shielding gas 16 flowing along the bottom plate 64 pushes the syngas 30 away from the region 104 and away from the exposed surface 106, thereby reducing syngas contact with the bottom plate 64. The reduction of syngas 30 contact with the bottom plate 64, attributed to the film or blanket of shielding gas 16, facilitates thermal control (e.g., cooling) and corrosion resistance along the bottom plate 64. For example, the film or blanket of shielding gas 16 reduces the likelihood of syngas condensation or corrosion on the bottom plate 64, and this resistance is particularly desirable in applications with corrosive feedstock (e.g., a high vanadium feedstock). In addition, the portion of the shielding gas 16 may re-circulate within the region 104, providing further heat and corrosion resistance to the bottom plate 64 and the quench ring 66.

A second portion of the shielding gas 16 (e.g., a shielding gas film or blanket) may flow along an exposed surface 110 of the quench ring 66, as shown by arrows 112. The shielding gas 16 (e.g., film or blanket) flowing around the quench ring 66 provides resistance against thermal stress and chemical attack (e.g., corrosion). For example, the film or blanket shielding gas 16 creates a localized cooling effect along the exposed surface 110, while also reducing the possibility of chemical attack (e.g., corrosion). The localized cooling reduces thermal gradients along the thickness of the quench ring 66. A third portion of the shielding gas 16 may flow midway between the surfaces 106 and 110, e.g., along arrows 114 between the arrows 108 and 112. The positive flow of the shielding gas 16 along the arrows 114 may reduce the effects of syngas recirculation within the region 104, thereby reducing the possibility and magnitude of condensation, corrosion, and thermal stress experienced by the bottom plate 64 and the quench ring 66. In other words, the positive flow of shielding gas 16 in the region 104 reduces the possibility of a low velocity or stagnant zone, which would otherwise represent a recirculation zone prone to entry of the high temperature, corrosive syngas 30. Again, the shielding gas 16 generally flows between and along the bottom plate 64 and the quench ring 66, thereby providing thermal protection (e.g., a blanket or film of convective cooling) and corrosion protection (e.g., a blanket or film of inert gas).

Figure 5:
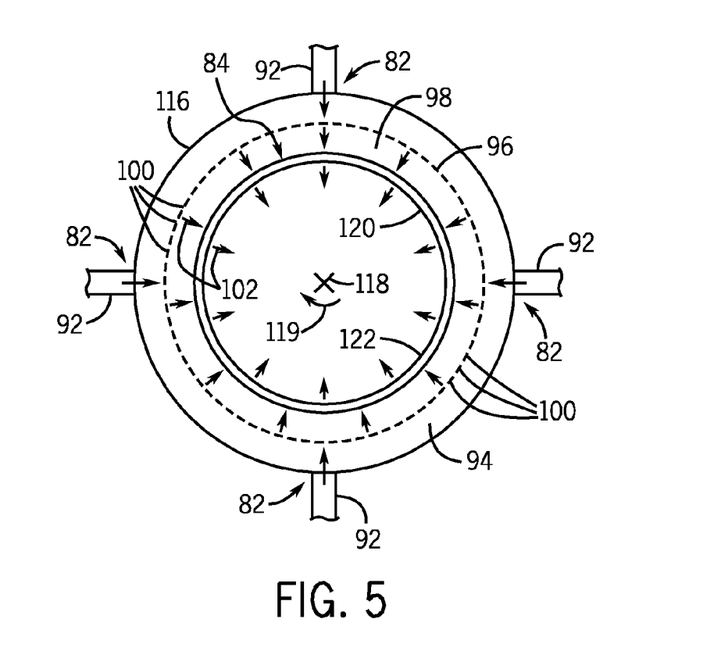
FIG. 5 is a cross-sectional top view of an embodiment of the shielding gas system of FIG. 3, taken within line 5-5, illustrating an inlet and an outlet of a shielding gas injector.

FIG. 5 is a partial schematic top view of the shielding gas injector 17, illustrating flow of the shielding gas 16. As shown, the shielding gas 16 enters the shielding gas injector 17 through four inlet gas conduits 92. The inlet gas conduits 92 are equally spaced about an outer circumference 116 of the shielding gas injector 17. In certain embodiments, the number and arrangement of the inlet gas conduits 92 may vary. For example, the shielding gas injector 17 may include 1, 2, 3, 4, 5, 6, or more inlet gas conduits 92. In addition, the inlet gas conduits 92 may be diametrically opposed, as shown, or arranged with a different pattern about the outer circumference 116. The number and arrangement of the inlet gas conduits 92 may be designed for optimal gas distribution, and may be implementation-specific.

The shielding gas 16 enters the first chamber 94 and flows to the second chamber 98 of the shielding gas injector 17. As illustrated, the first and second chambers 94 and 98 (e.g., annular chambers) are coaxial (or concentric) with a central axis 118 of the shielding gas injector 17. Such an arrangement may enable symmetrical flows between the first and second chambers 94 and 96, thereby improving the efficiency of the shielding gas injector 17. After flowing to the second chamber 98, the shielding gas 16 exits the shielding gas injector 17 through the outlet 84. As illustrated, the outlet 84 may be an annular slot 120 disposed on an inner diameter 122 of the shielding gas injector 17. The annular slot 120 extends circumferentially about the central axis 118. In certain embodiments, the annular slot 120 is a single annular slot 120 that extends substantially or entirely (e.g., approximately 360 degrees) about the central axis 118. The single slot 120 may improve the distribution of the shielding gas 16 and thus, improve the operability of the gasifier 12. In certain embodiments, the number and arrangement of outlets 84 may vary. For example, the shielding gas injector 17 may include 1, 2, 3, 4, 5, 6, 7, 8, 9, 10, 50, 100, or more outlets 84 disposed circumferentially 119 (e.g., equally spaced) about the inner diameter 122. In addition, the outlets 84 may be designed to preferentially direct air along the bottom plate 64 of the transition section 60 or along the exposed surface 110 of the quench ring 66.

Figure 6:
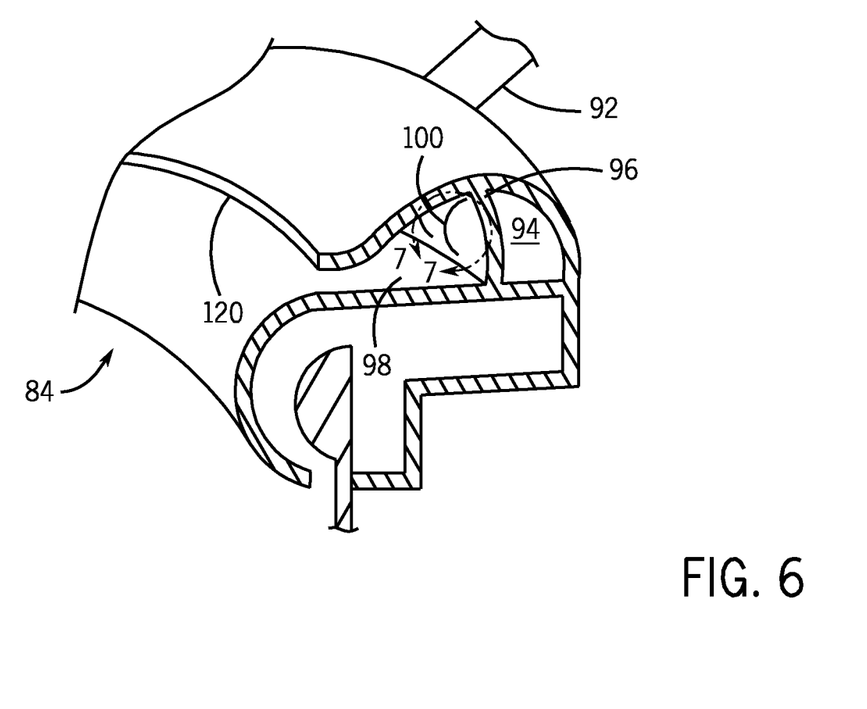
FIG. 6 is a partial perspective view of an embodiment of the shielding gas injector of FIG. 5, illustrating a flow conditioning barrier disposed between the inlet and the outlet of the shielding gas injector.

FIG. 6 is a partial perspective view of the quench ring 64 and the shielding gas injector 17, illustrating the holes 100 of the flow conditioning barrier 96. As shown, the flow conditioning barrier 96 includes a plurality of holes 100. In certain embodiments, the number of holes 100 may vary. For example, the flow conditioning barrier 96 may include 1, 2, 3, 4, 5, 6, 7, 8, 9, 10, 50, 100, or more holes 100. Indeed, an embodiment of the flow conditioning barrier 96 may include a single annular slot that is similar to the annular slot 120. The shape of the holes 100 may also vary, as shown in FIGS. 7 and 8.

Figure 7:
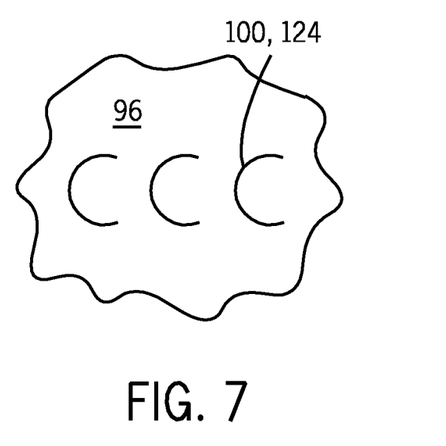
FIG. 7 is a partial view of the flow-conditioning barrier of FIG. 6, illustrating multiple fish-scale openings to transfer the shielding gas, while conditioning the flow to be more uniform, from the inlet to the outlet of the shielding gas injector.
Figure 8:
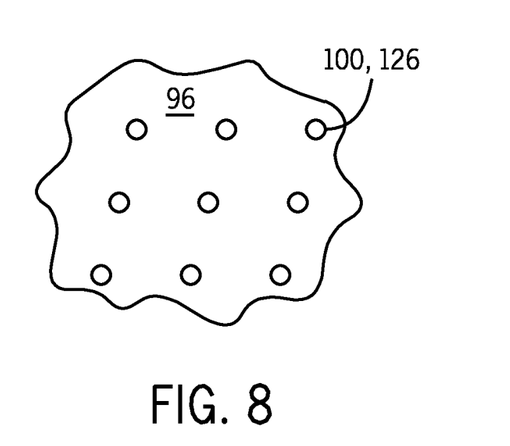
FIG. 8 is a partial view of the flow-conditioning barrier of FIG. 6, illustrating multiple perforations to transfer the shielding gas, while conditioning the flow to be more uniform, from the inlet to the outlet of the shielding gas injector.

FIG. 7 illustrates fish-scale (e.g., U-shaped or C-shaped) holes 100, 124 to transfer the shielding gas 16 between the first and second chambers 94 and 98. The fish-scale holes 100, 124 may induce desirable flow profiles to the shielding gas 16. Additionally or alternatively, the flow conditioning barrier 96 may include circular holes or perforations 100, 126, as shown in FIG. 8. The perforations or holes 100, 126 may enable a symmetric distribution of the shielding gas into the second chamber 98. The number and shape of the holes 100 may be implementation-specific and may vary among embodiments.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The invention claimed is:

1. A system, comprising:
   a gasifier, comprising:
      a reaction chamber configured to convert a feedstock into a synthetic gas;
      a quench chamber configured to cool the synthetic gas;
      a flow path of the synthetic gas in a flow direction through the reaction chamber and the quench chamber;
      a quench chamber sump configured to receive a coolant;
      a dip tube disposed above the quench chamber sump, wherein the dip tube extends circumferentially about an axis of the gasifier;
      a quench ring disposed above the dip tube, wherein the quench ring extends circumferentially about the axis of the gasifier, and the quench ring is configured to provide a first flow of the coolant along a surface of the dip tube to the quench chamber;
      a transition section between the reaction chamber and the quench chamber;
      a shielding gas system disposed downstream of the reaction chamber and upstream of the dip tube relative to the flow direction of the synthetic gas, wherein the shielding gas system comprises a shielding gas injector having at least one shielding gas outlet configured to provide a second flow of a shielding gas into the flow path of synthetic gas to protect at least one of the quench ring or the transition section.

2. The system of claim 1, wherein the shielding gas injector is coupled to the quench ring in a side-by-side arrangement.

3. The system of claim 1, wherein the shielding gas injector is configured to provide the second flow of the shielding gas ring along an inner circumferential surface of the quench ring exposed to the synthetic gas.

4. The system of claim 1, wherein the shielding gas injector is configured to provide the second flow of the shielding gas ring along a bottom surface of the transition section exposed to the synthetic gas.

5. The system of claim 1, wherein the transition section comprises a tapered refractory section and a floor section, the quench ring is disposed in the quench chamber, and the shielding gas injector is disposed downstream of the transition section between the quench ring and the floor section.

6. The system of claim 1, wherein the shielding gas injector extends circumferentially about the axis of the gasifier.

7. The system of claim 6, wherein the shielding gas injector comprises a hollow annular enclosure extending circumferentially about the axis of the gasifier, and the shielding gas injector comprises at least one shielding gas inlet and the at least one shielding gas outlet.

8. The system of claim 7, wherein the at least one shielding gas outlet comprises an annular slot extending circumferentially about the axis of the gasifier.

9. The system of claim 7, wherein the hollow annular enclosure comprises inner and outer annular chambers divided by a flow conditioning barrier.

10. The system of claim 9, wherein the flow conditioning barrier comprises one or more openings configured to distribute the second flow of the shielding gas from the outer annular chamber to the inner annular chamber.

11. The system of claim 1, wherein the shielding gas injector is disposed downstream from the transition section.

12. The system of claim 1, wherein the shielding gas system is configured to provide the second flow of the shielding gas in a region to inhibit recirculation of the synthetic gas, to inhibit thermal stress, or to inhibit corrosion in the region.

13. The system of claim 1, wherein the shielding gas system is configured to provide the second flow of the shielding gas comprising carbon dioxide or an inert gas.

14. The system of claim 13, comprising an air separation unit configured to separate air into oxygen and nitrogen, wherein the air separation unit is configured to provide at least a portion of the nitrogen to the shielding gas system.

15. The system of claim 13, comprising a carbon capture system configured to capture carbon dioxide from the synthetic gas, and the carbon capture system is configured to provide the carbon dioxide to the shielding gas system.

16. A system, comprising:
   a shielding gas system comprising a shielding gas injector configured to provide a flow of a shielding gas through at least one shielding gas outlet into a region to protect at least one of a quench ring in a quench chamber or a transition section between reaction and quench chambers of a gasifier, wherein the region is disposed downstream of the transition section or between the reaction chamber and a dip tube below the quench ring.

17. The system of claim 16, comprising the quench ring having an inner circumference disposed about an axis, a first axial side, and a second axial side, wherein the shielding gas injector is coupled to the first axial side.

18. The system of claim 17, wherein the dip tube is coupled to the second axial side of the quench ring.

19. The system of claim 16, wherein the shielding gas injector comprises a hollow enclosure extending circumferentially about a central axis, the hollow enclosure comprises at least one shielding gas inlet and the at least one shielding gas outlet, the at least one shielding gas outlet extends circumferentially about the central axis, the hollow enclosure comprises inner and outer annular chambers divided by a flow conditioning barrier, and the flow conditioning barrier comprises a plurality of openings, wherein the shielding gas injector is configured to flow the shielding gas through a flow path along the at least one shielding gas inlet, the outer annular chamber, the flow conditioning barrier, the inner annular chamber, and the at least one shielding gas outlet.

20. The system of claim 16, wherein the region is disposed downstream of the transition section.

21. The system of claim 16, wherein the region is disposed between the reaction chamber and a dip tube below the quench ring.

22. A method, comprising:
   providing a flow of a shielding gas through at least one shielding gas outlet into a region to protect at least one of a quench ring or a transition section of a gasifier, wherein the quench ring is disposed in a quench chamber of the gasifier, and the transition section is disposed between the quench chamber and a reaction chamber of the gasifier, wherein the region is disposed downstream of the transition section or between the reaction chamber and a dip tube below the quench ring.

23. The method of claim 22, wherein providing the flow of the shielding gas comprises receiving a nitrogen flow from an air separation unit, a carbon dioxide flow from a carbon capture system, or a combination thereof.

* * * * *